United States Patent
Paus et al.

(10) Patent No.: US 10,723,256 B2
(45) Date of Patent: Jul. 28, 2020

(54) DEVICE AND A METHOD FOR CONTROLLING A HEADLIGHT OF A VEHICLE

(71) Applicant: Aptiv Technologies Limited, St. Michael (BB)

(72) Inventors: Andre Paus, Wuppertal (DE); Monika Heift, Wuppertal (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 16/514,216

(22) Filed: Jul. 17, 2019

(65) Prior Publication Data
US 2020/0031272 A1 Jan. 30, 2020

(30) Foreign Application Priority Data

Jul. 30, 2018 (EP) .................................. 18186358

(51) Int. Cl.
*B60Q 1/14* (2006.01)
*B60R 11/04* (2006.01)

(52) U.S. Cl.
CPC ........ *B60Q 1/143* (2013.01); *B60Q 2300/314* (2013.01); *B60Q 2300/41* (2013.01); *B60Q 2300/42* (2013.01); *B60R 11/04* (2013.01)

(58) Field of Classification Search
CPC ............. G06K 9/0063; G06K 9/00798; G06K 9/00805; G06K 9/00825; G06K 9/4638; G06K 9/209; G06K 2370/21; G06K 2370/33; G06K 2370/332; B60Q 1/04; B60Q 1/143; B60Q 1/1423; B60Q 2300/314; B60Q 2300/41; B60Q 2300/42; G06T 2207/30236; G06T 2207/30244; G06T 2207/30256; H05B 37/02; H05B 37/029; B60R 11/04; B60R 2011/004
See application file for complete search history.

(56) References Cited

U.S. PATENT DOCUMENTS

| 3,177,397 A | 4/1965 | Keeran |
| 3,273,012 A | 9/1966 | Rosenblum |
| 6,091,833 A * | 7/2000 | Yasui ................... G05D 1/0246 382/104 |

(Continued)

FOREIGN PATENT DOCUMENTS

WO 2013102526 A1 7/2013

OTHER PUBLICATIONS

Mefford, M. L., Flannagan, M. J., & Bogard, S. E. (2006). Real world use of high-beam headlamps. University of Michigan: Transportation Research Institute, (UMTRI—Nov. 2006), 2-10.

(Continued)

*Primary Examiner* — Haissa Philogene

(57) ABSTRACT

A device for controlling a headlight of a vehicle is configured to receive images consecutively captured by a camera, the images showing an area in front of a vehicle, detect a road in one of the images, divide the road detected in the image in segments, track the segments over time in the images, determine at least one feature related to the brightness for each of the segments, determine from the features related to the brightness of the segments whether preceding and/or oncoming traffic exists, and generate a control signal for controlling a headlight of the vehicle if preceding and/or oncoming traffic exists.

25 Claims, 3 Drawing Sheets

(56) References Cited

U.S. PATENT DOCUMENTS

| | | | |
|---|---|---|---|
| 7,526,103 B2* | 4/2009 | Schofield | G08G 1/166 |
| | | | 382/104 |
| 7,636,455 B2* | 12/2009 | Keaton | G06K 9/0063 |
| | | | 348/118 |
| 8,493,446 B2* | 7/2013 | Li | B60Q 1/143 |
| | | | 250/205 |
| 8,511,872 B2* | 8/2013 | Schmidt | B60Q 1/12 |
| | | | 362/37 |
| 8,665,079 B2* | 3/2014 | Pawlicki | B60K 31/0008 |
| | | | 340/435 |
| 9,555,803 B2* | 1/2017 | Pawlicki | B60W 30/18 |
| 9,889,790 B2 | 2/2018 | Liken et al. | |
| 2009/0296415 A1 | 12/2009 | Heinrich et al. | |
| 2010/0265330 A1 | 10/2010 | Li et al. | |
| 2018/0127001 A1* | 5/2018 | Ricci | B60R 25/2018 |
| 2018/0202814 A1* | 7/2018 | Kudrynski | G06T 7/55 |

OTHER PUBLICATIONS

Reagan, I. J., Brumbelow, M. L., Flannagan, M. J., & Sullivan, J. M. (2017). High beam headlamp use rates: Effects of rurality, proximity of other traffic, and roadway curvature. Traffic injury prevention).

* cited by examiner

DEVICE AND A METHOD FOR CONTROLLING A HEADLIGHT OF A VEHICLE

CROSS-REFERENCE TO RELATED APPLICATION

This application claims the benefit under 35 U.S.C. § 119(a) of European Patent Application EP 18186358.0, filed Jul. 30, 2018, the entire disclosure of which is hereby incorporated herein by reference.

TECHNICAL FIELD OF INVENTION

The invention concerns a device and a method for controlling a headlight of a vehicle.

BACKGROUND OF INVENTION

Several studies, including recent ones, show that the rate of high beam use in vehicles is only about 25% in suitable situations (see Mefford, M. L., Flannagan, M. J., & Bogard, S. E. (2006). Real world use of high-beam headlamps. University of Michigan: Transportation Research Institute, (UMTRI-2006-11), 2-10 and Reagan, I. J., Brumbelow, M. L., Flannagan, M. J., & Sullivan, J. M. (2017). High beam headlamp use rates: Effects of rurality, proximity of other traffic, and roadway curvature. Traffic injury prevention). Possible reasons for this are that the driver has to focus on upcoming vehicles to switch to low beam in time in order not to glare other drivers, which causes additional strain. Thus, many drivers either often switch back to low beam too late and glare other drivers, or do not switch on high beam at all. But low beam provides sufficient lighting only for velocities up to 70 km/h. When driving at higher velocities without sufficient light conditions switching to high beam is obligatory. To solve this problem, automatic high beam control has been developed since 1953 (see documents U.S. Pat. Nos. 3,177,397 A and 3,273,012 A). Today, this technology depends on camera sensors (see document WO 2013/102 526 A1): a forward camera provides images, algorithms search the camera frame for bright spots similar to head or taillights and a machine trained classifier classifies these detections as vehicle lights or light spots of other origin.

SUMMARY OF THE INVENTION

Vehicle lights cannot be detected before they become visible to the camera sensor. Because of the system process chain, a short period of time between the vehicle coming into appearance and switching to low beam cannot be avoided. This does not pose a problem if the vehicle appears at a great distance because the glaring effect of the high beam is reduced with distance. If the own vehicle is being overtaken, a certain time lag does not cause a problem if the automatic headlight control device switches to low beam before the own vehicle's headlights glare the driver through the rear mirrors of the overtaking car. If, though, the line-of-sight to the other vehicle has been blocked by obstacles like trees, buildings, parked vehicles or terrain, current automatic headlight control devices cannot avoid glaring the other driver for a short period of time. Since the iris of the human eye constricts quickly but dilates slowly (see Ellis, C. J. (November 1981), The pupillary light reflex in normal subjects, Br. J. Ophthalmol. 65 (11), 754-759), even a short glaring time span can have a blinding effect. This is a disadvantage of current automatic headlight control devices opposed to manual headlight control. A human driver is often able to know an oncoming vehicle will appear before it is visible because of the illumination caused by the other vehicle and will switch off preemptively high beam before the vehicle comes into sight.

It is an underlying object of the invention to provide a device for controlling a headlight of a vehicle, which allows switching to low beam before the drivers of preceding and/or oncoming traffic are glared by the own high beam. It is further an object of the invention to provide a system that comprises the device and a method for controlling a headlight of a vehicle. The object underlying the invention is satisfied by the features of the independent claims. Advantageous further developments and aspects of the invention are set forth in the dependent claims.

In a first aspect of the instant application a device for controlling a headlight of a vehicle, i.e., the ego vehicle, is provided. The device is configured to receive images consecutively captured by a camera. The camera may be mounted on the vehicle and is configured to capture images of the area in front of the vehicle, in particular, while the vehicle moves. If the vehicle is driven on a road, the images captured by the camera show the road scenario in front of the vehicle. In particular, the images can be captured during poor visibility conditions when head and tail lights of vehicles are switched on, for example, at twilight and at night. The device is configured to detect a road in at least one of the images captured by the camera. The device is configured to model the road detected in the at least one image and divide the road model in a plurality of segments. The device is configured to track the segments over time in the images. For example, in case of a winding road, the segments, in particular corner points of the segments, have to be adjusted for each image to follow the road. The device is configured to determine at least one feature or value related to the brightness for each of the segments. Thus, for each segment in each image, the device may determine the brightness of the respective segment and/or another feature or value which is related to the brightness or a change of brightness in the respective segment. The device is configured to determine, in particular decide, from the features related to the brightness of the segments whether preceding and/or oncoming traffic exists. Preceding traffic can comprise cars or other vehicles driving in front of the ego vehicle or overtaking the ego vehicle. Oncoming traffic can comprise cars or other vehicles driving in the opposite direction than the ego vehicle. Further, the device is configured to generate a control signal for controlling a headlight, in particular headlights, of the vehicle if preceding and/or oncoming traffic exists. The control signal can be sent to the headlight or a control unit of the headlight. Current state of the art automatic headlight control devices use visual detection of light spots in images to detect preceding and/or oncoming vehicles. They rely on a line-of-sight between the other vehicles' lights and the own camera and thus cannot avoid glaring the drivers of other vehicles with the own high beam headlights. The device according to the first aspect of the application improves detection of headlights before they are in direct sight by observing the environment ahead for signatures of increasing indirect illumination caused by headlights of other vehicles. Contrary to conventional devices, the device presented herein does not rely on a line-of-sight between the lights of the other vehicles and the own camera. The device according to the first aspect allows to detect headlights of other vehicles and to switch to low beam before the drivers of these vehicles are glared at by the own high beam. The at least one feature related to the brightness of one of the segments can be one of the following: a mean brightness of the respective segment, a variance of the brightness of the respective segment and a relative brightness of the respective segment with respect to a brightness of the environment of the road. The mean brightness of a segment can be calculated as the mean grey value of all pixels inside the respective segment. The variance of the brightness of a segment can be calculated as the variance of the grey values of pixels inside the respective segment. The relative brightness of a segment with respect to a brightness of the environment of the road can be calculated as the ratio of the mean brightness of the respective segment to the mean brightness of the environment of the road. In one embodiment, each of the segments has the shape of a trapezoid. The segments can be arranged such that the distance to the vehicle is different for each segment. Corner points of each segment can be tracked over time in the images. Further, the segments can have the same real world length. The device may be further configured to determine that preceding and/or oncoming traffic exists if the at least one feature related to the brightness of at least one of the segments surpasses a first threshold. For example, the device can decide that preceding and/or oncoming traffic exists if the mean brightness in at least one of the segments is equal to or higher than the first threshold. Alternatively or additionally the device can decide that preceding and/or oncoming traffic exists if a rise of the at least one feature related to the brightness of at least one of the segments surpasses a second threshold. For example, the device can monitor the mean brightness in the segments. In case the difference of the mean brightness values for at least one of the segments in two or more consecutive images is equal to or higher than the second threshold, the device can decide that preceding and/or oncoming traffic exists. The first threshold and/or the second threshold can be fixed values, but can also be variable. In the latter case, the first threshold and/or the second threshold may, for example, depend on the real world distance of the vehicle to the at least one segment in which the at least one feature related to the brightness or the rise of this feature surpasses the first or second threshold, and/or the brightness of the environment of the road, and/or whether a high beam of the vehicle is switched on. The first and/or second threshold may also depend on further and/or other parameters. If the at least one feature related to the brightness surpasses the first threshold or the rise of this feature surpasses the second threshold in at least one segment, the device may determine the real world distance of the vehicle to the at least one segment. If the first or second threshold is surpassed in more than one segment, the device may determine the real world distance of the vehicle to the nearest segment. In a further embodiment, the device uses a machine trained algorithm to decide from the features related to the brightness of the segments whether preceding and/or oncoming traffic exists. The applied algorithm has to be chosen depending on the imager and the available performance of the CPU-processor. During the training of the algorithm video sequences of situations with preceding and/or oncoming traffic are used as well as videos sequences without traffic. The parameters of the machine trained algorithm are optimized with regard to a minimal discrepancy between traffic prediction and ground truth. If conventional headlights are used that have only low beam and high beam settings, the control signal may comprise a command to switch the headlights to low beam in case preceding and/or oncoming traffic has been detected. If advanced beam forming headlights are used, the light beam of the headlights can be adjusted such that the light beam does not reach to the preceding and/or oncoming traffic. According to a second aspect of the instant application, a system for controlling a headlight of a vehicle comprises a camera for capturing images and a device as described above.

According to a third aspect of the instant application, a method for controlling a headlight of a vehicle comprises the following steps:

receiving images consecutively captured by a camera, the images showing an area in front of a vehicle;

detecting a road in one of the images;

dividing the road detected in the image into segments;

tracking the segments over time in the images;

determining at least one feature related to the brightness for each of the segments;

determining from the features related to the brightness of the segments whether preceding and/or oncoming traffic exists; and generating a control signal for controlling a headlight of the vehicle if preceding and/or oncoming traffic exists.

The method according to the third aspect of the application may comprise the embodiments disclosed above in connection with the device according to the first aspect of the application.

BRIEF DESCRIPTION OF DRAWINGS

The present invention will now be described, by way of example with reference to the accompanying drawings, in which.

DETAILED DESCRIPTION

Figure 1:
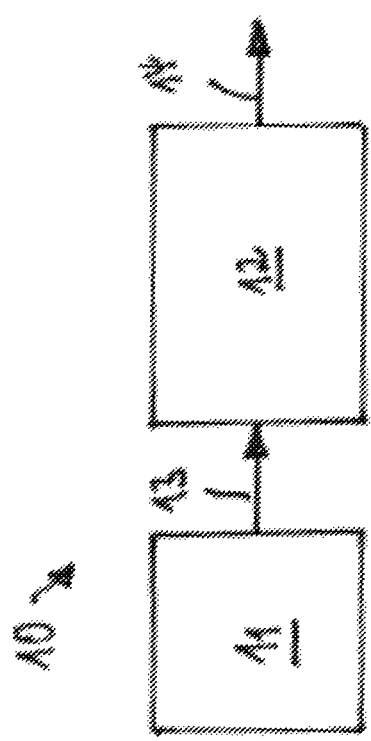
FIG. 1 is a schematic representation of an exemplary embodiment of a system for controlling a headlight of a vehicle in accordance with one embodiment.
Figure 2:
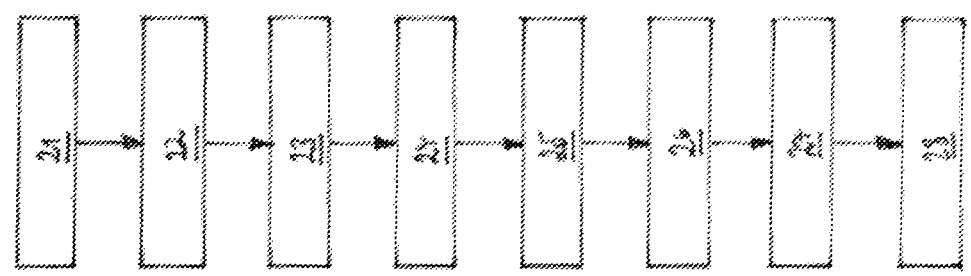
FIG. 2 is a schematic representation of an exemplary embodiment of a method for controlling a headlight of a vehicle in accordance with one embodiment.

FIG. 1 schematically illustrates a system 10 for controlling a headlight of a vehicle. The system 10 includes a camera 11 and a device 12. The system 10 is installed in the vehicle, which is the ego vehicle. The camera 11 is mounted on the vehicle and captures images 13 of the area/environment in front of the vehicle. The images 13 captured by the camera 11 are fed to the device 12. The device 12 performs a method 20 for controlling the headlight of the vehicle and generates an control signal 14 which contains information on whether preceding and/or oncoming traffic in front of the vehicle exists. The method 20 is schematically illustrated in FIG. 2. The device 12, the system 10, and the method 20 are exemplary embodiments according to the first, second and third aspect of the application, respectively.

The problem of latency between the appearance of the head or tail lights of a vehicle and the automatic switch to low beam is overcome by the device 12, which includes a preemptive advanced headlight control. This solution is motivated by the human strategy to observe the environment for a change of illumination which is caused by other vehicles' headlights. For the technical application of this principle, the observed environment is reduced to the road 15 the ego vehicle is driving on and its surrounding. The road 15 ahead is divided into segments, which have in particular a predetermined, fixed length. These segments are tracked as they are approached by the ego vehicle. For each segment the brightness related features of the road 15 and the area next to it are calculated. If in one of these segments a significant rise of illumination is detected, the distance of this segment is reported to the vehicle's CAN (controller area network) bus such that the headlights of the ego vehicle can be switched to low beam. Thus the device 12 not only detects the headlights of other vehicles, but also aims at detecting scattered light caused by the headlights of other vehicles.

In step 21 of the method 20 illustrated in FIG. 2, the camera 11 captures images 13 of the scene ahead of the vehicle. If the vehicle is driven on a road 15, the images 13 show the road 15. The camera 11 captures the images 13 in consecutive frames. For example, a single image 13 is captured in each frame. The camera 11 can be a monocular imager mounted at the top or bottom of the windscreen.

In step 22, the device 12 receives the images 13 captured by the camera 11 in step 21. Additionally, the device 12 receives further information on the vehicle, in particular, speed and/or turn rate.

In step 23, a road boundary detection unit of the device 12 detects road boundaries in one of the images 13 provided by the camera 11 and fits a road boundary model to the detection.

Figure 3B:
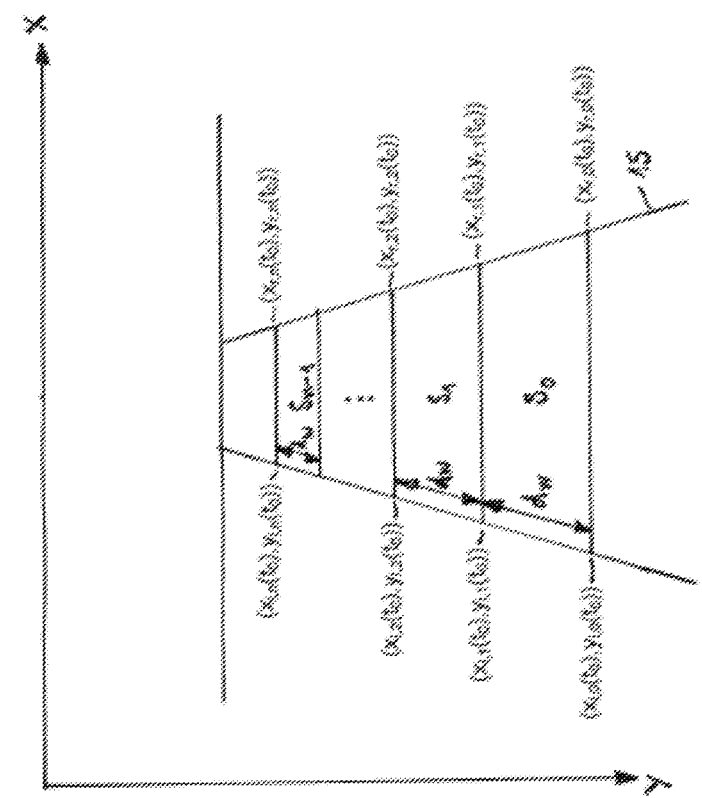
FIG. 3B is a schematic representations of a road detected in images and modelled by a plurality of segments in accordance with one embodiment.
Figure 3A:
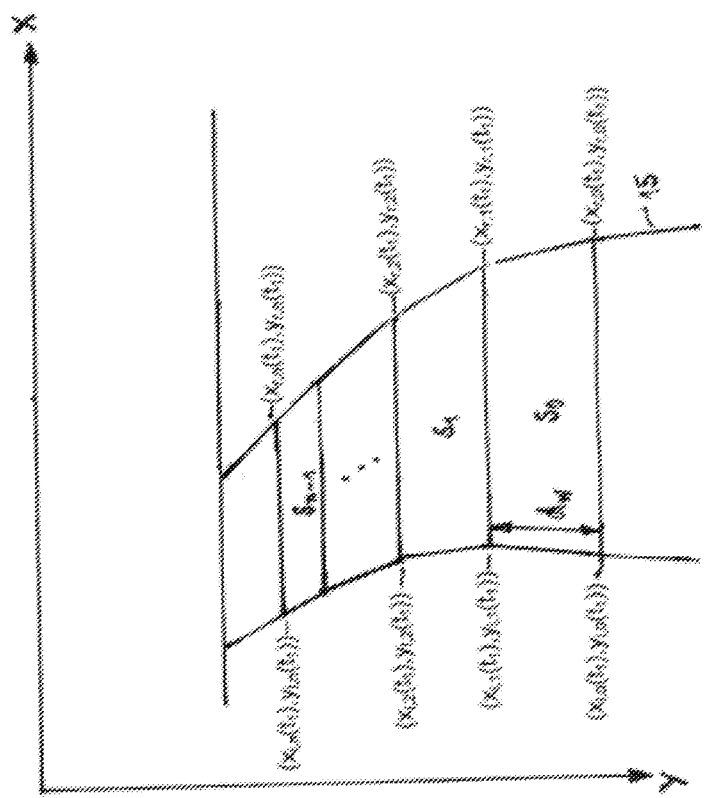
FIG. 3A is a schematic representation of a road detected in images and modelled by a plurality of segments in accordance with one embodiment.

In step 24, the device 12 models the road 15 ahead detected by the road boundary detection unit as n segment patches. An example of a road 15 modelled by n segments $S_i$ (with i=0, 1, . . . , n) is schematically illustrated in FIG. 3A. The model of the road 15 is based on an image 13 which was taken by the camera 11 at time t0. Each of the segments $S_i$ has the same length dw in real world. The length dw can be adjusted during the implementation based on the resolution of the camera 11. Each segment $S_i$ is modelled as a trapezoid having four corner points. The bottom line and the top line of each trapezoid are parallel lines. The corner points of the segments $S_i$ have coordinates in a coordinate system with x and y axes as shown in FIG. 3A. The two corner points on the left hand side of the segment $S_i$ are denoted as $(xl,i(t0),yl,i(t0))$ and $(xl,i+1(t0),yl,i+1(t0))$, and the two corner points on the right hand side of the segment $S_i$ are denoted as $(xr,i(t0),yr,i(t0))$ and $(xr,i+1(t0),yr,i+1(t0))$. For example, the coordinates of the corner points of the segment $S0$ are $(xl,0(t0),yl,0(t0))$, $(xl,1(t0),yl,1(t0))$, $(xr,0(t0),yr,0(t0))$ and $(xr,1(t0),yr,1(t0))$. The coordinates of the segments $S_i$ for both the left and the right road boundaries are calculated using the road boundary model provided by the road boundary detection unit.

As the own vehicle moves along the road 15, the positions of the segments $S_i$ are tracked and updated so that the trapezoid corners are mapped to the same real world position relative to the vehicle. Exemplarily the road 15 as captured by the camera 11 at time t1 is shown in FIG. 3B. Here the road 15 curves to the left so that the shapes of the segments $S_i$ are adjusted. The coordinates of the corner points of the segment $S_i$ at time t1 are $(xl,i(t1),yl,i(t1))$, $(xl,i+1(t1),yl,i+1(t1))$, $(xr,i(t1),yr,i(t1))$ and $(xr,i+1(t1),yr,i+1(t1))$.

In step 25, for each segment $S_i$ one or more features or values that are related to the brightness of the respective segment $S_i$ are calculated. The features are calculated from the image data provided by the camera 11.

For example, one or more of the following features can be calculated for each segment $S_i$ of an image 13: mean brightness ($b_i$), variance of brightness ($v_i$), and relative brightness ($r_i$). The mean brightness, $b_i$, is generated by calculating the mean grey values of all pixels inside the trapezoid patch of the element $S_i$. The variance of brightness, $v_i$, is calculated as the variance of the grey values of pixels inside the trapezoid patch of the element $S_i$. The relative brightness, $r_i$, is the mean brightness, $b_i$, compared to brightness of the image 13 in the area next to the road 15. This feature is calculated as the ratio of the segment's mean brightness, $b_i$, to the mean brightness of the environment of the road 15. As the trapezoidal segments $S_i$ are tracked over time, the features calculated for each image 13 form time dependent functions $b_i(t)$, $v_i(t)$ and $r_i(t)$, where t denotes the time when the camera 11 generated the image 13.

In step 26, the progress of the features $b_i(t)$, $v_i(t)$, and $r_i(t)$ is monitored. A rise of the features $b_i(t)$ and $r_i(t)$ may indicate increased illumination because of other vehicles' headlights. The progress of these features is used to decide if they are caused by a not yet visible vehicle which is approaching or overtaking. If the rise of the illumination surpasses a threshold, an approaching vehicle is predicted by the device 12. The absolute values of the features $b_i(t)$ and $r_i(t)$ may be compared to a respective first threshold. For example, if the absolute value of one of the features $b_i(t)$ and $r_i(t)$ is equal to or greater than the respective first threshold, the device 12 decides that preceding and/or oncoming traffic exists. Further, the change of the features $b_i(t)$ and $r_i(t)$ with time may be monitored and compared to a respective second threshold. For example, if the rise of one of the features $b_i(t)$ and $r_i(t)$ within a predetermined time interval is equal to or greater than the respective second threshold, the device 12 decides that preceding and/or oncoming traffic exists. The values of the first threshold and/or the second threshold may be variable and may depend on several parameters, for example, the real world distance of the segment $S_i$ to the ego vehicle, the brightness of the environment of the road 15 and the low/high beam state of the own vehicle. For example, the first and/or second thresholds are reduced with increasing distance of the segment $S_i$ to the ego vehicle. Further, in case of higher ambient light the first and/or second threshold may rise.

The decision whether preceding and/or oncoming traffic exists can be made by a machine trained algorithm. The applied algorithm has to be chosen depending on the type of the camera 11 and the available performance of the CPU-processor. During the training video sequences of situations with preceding and/or oncoming traffic is used as well as videos sequences without traffic. The parameters of machine trained algorithm are optimized with regard to a minimal discrepancy between traffic prediction and ground truth. During runtime, the calculated features, for example, the features $b_i(t)$, $v_i(t)$ and $r_i(t)$, are used as input values for the machine trained algorithm.

In step 27, if a significant rise of one or more of the features that are monitored is detected in one or more adjoining segments, the real world distance of the segment $S_i$ that is nearest to the ego vehicle is estimated. This distance is then reported to the vehicle's CAN bus.

In step 28, the device 12 generates the control signal 14 for controlling the headlights of the vehicle. If conventional headlights are used, the control signal 14 includes a command to switch the headlights to low beam setting in case they are currently in the high beam setting. If advanced, beam forming headlights are used, the control signal 14 includes a command to adjust the light beam such that the maximum distance in the direction of the lit segment is set to the estimated segment distance.

While this invention has been described in terms of the preferred embodiments thereof, it is not intended to be so limited, but rather only to the extent set forth in the claims that follow.

We claim:

1. A device for controlling a headlight of a vehicle, the device is configured to:
   receive images consecutively captured by a camera, the images showing an area in front of the vehicle;
   detect a road in one of the images;
   divide the road detected in the images into segments;
   track the segments over time in the images;
   determine at least one feature related to a brightness for each of the segments;
   determine from the at least one feature related to the brightness of the segments whether preceding and/or oncoming traffic exists; and
   generate a control signal for controlling the headlight of the vehicle if preceding and/or oncoming traffic exists.

2. The device as claimed in claim 1, wherein the at least one feature related to the brightness for one of the segments is at least one of a mean brightness of the respective segment, a variance of the brightness of the respective segment, and a relative brightness of the respective segment with respect to a brightness of an environment of the road.

3. The device as claimed in claim 1, wherein each of the segments has a shape of a trapezoid and corner points of each of the segments are tracked over time in the images.

4. The device as claimed in claim 1, wherein the device is further configured to determine that preceding and/or oncoming traffic exists if one or more of;
   the at least one feature related to the brightness of at least one of the segments surpasses a first threshold; and
   a rise of the at least one feature related to the brightness of at least one of the segments surpasses a second threshold.

5. The device as claimed in claim 4, wherein at least one of the first threshold and the second threshold depend on the distance of the vehicle to at least one segment.

6. The device as claimed in claim 4, wherein at least one of the first threshold and the second threshold depend on the brightness of an environment of the road.

7. The device as claimed in claim 4, wherein at least one of the first threshold and the second threshold depend on whether a high beam of the vehicle is switched on.

8. The device as claimed in claim 4, wherein the device is further configured to determine the distance of the vehicle to at least one segment.

9. The device as claimed in claim 1, wherein the device is further configured to use a machine trained algorithm to determine from the at least one feature related to the brightness of the segments whether preceding and/or oncoming traffic exists.

10. The device as claimed in claim 1, wherein the control signal comprises a command to switch the headlight to low beam.

11. The device as claimed in claim 1, wherein the control signal comprises a command to form a light beam of the headlight such that the light beam does not reach to the preceding and/or oncoming traffic.

12. A system for controlling a headlight of a vehicle, the system comprising:
   a camera configured to capture images; and
   a device for controlling the headlight of the vehicle, the device is configured to:
      receive the images consecutively captured by the camera, the images showing an area in front of the vehicle;
      detect a road in one of the images;
      divide the road detected in the images into segments;
      track the segments over time in the images;
      determine at least one feature related to a brightness for each of the segments;
      determine from the at least one feature related to the brightness of the segments whether preceding and/or oncoming traffic exists; and
      generate a control signal for controlling the headlight of the vehicle if preceding and/or oncoming traffic exists; wherein
   the device is further configured to use a machine trained algorithm to determine from the at least one feature related to the brightness of the segments whether preceding and/or oncoming traffic exists.

13. A method for controlling a headlight of a vehicle, the method comprising:
   receiving images consecutively captured by a camera, with a device, the images showing an area in front of the vehicle;
   detecting, with the device, a road in one of the images;
   dividing, with the device, the road detected in the images into segments;
   tracking, with the device, the segments over time in the images;
   determining, with the device, at least one feature related to a brightness for each of the segments;
   determining, with the device, from the at least one feature related to the brightness of the segments whether preceding and/or oncoming traffic exists; and
   generating, with the device, a control signal for controlling the headlight of the vehicle if preceding and/or oncoming traffic exists.

14. The method as claimed in claim 13, wherein the at least one feature related to the brightness for one of the segments is at least one of a mean brightness of the respective segment, a variance of the brightness of the respective segment, and a relative brightness of the respective segment with respect to a brightness of an environment of the road.

15. The method as claimed in claim 13, wherein each of the segments has a shape of a trapezoid and corner points of each of the segments are tracked over time in the images.

16. The method as claimed in claim 13, wherein the device is further configured to determine that preceding and/or oncoming traffic exists if one or more of;
   the at least one feature related to the brightness of at least one of the segments surpasses a first threshold; and
   a rise of the at least one feature related to the brightness of at least one of the segments surpasses a second threshold.

17. The method as claimed in claim 16, wherein at least one of the first threshold and the second threshold depend on the distance of the vehicle to at least one segment.

18. The method as claimed in claim 16, wherein at least one of the first threshold and the second threshold depend on the brightness of an environment of the road.

19. The method as claimed in claim 16, wherein at least one of the first threshold and the second threshold depend on whether a high beam of the vehicle is switched on.

20. The method as claimed in claim 16, wherein the device is further configured to determine the distance of the vehicle to at least one segment.

21. The method as claimed in claim 13, wherein the device is further configured to use a machine trained algorithm to determine from the at least one feature related to the brightness of the segments whether preceding and/or oncoming traffic exists.

22. The method as claimed in claim 13, wherein the control signal comprises a command to switch the headlight to low beam.

23. The method as claimed in claim 13, wherein the control signal comprises a command to form a light beam of the headlight such that the light beam does not reach to the preceding and/or oncoming traffic.

24. A device for controlling a headlight of a vehicle, the device is configured to:
- receive images consecutively captured by a camera, the images showing an area in front of the vehicle;
- detect a road in one of the images;
- divide the road detected in the images into segments;
- track the segments over time in the images;
- determine at least one feature related to a brightness for each of the segments;
- determine from the at least one feature related to the brightness of the segments whether preceding and/or oncoming traffic exists; and
- generate a control signal for controlling the headlight of the vehicle if preceding and/or oncoming traffic exists; wherein the device is further configured to determine that preceding and/or oncoming traffic exists if one or more of;
the at least one feature related to the brightness of at least one of the segments surpasses a first threshold; and
a rise of the at least one feature related to the brightness of at least one of the segments surpasses a second threshold.

25. A method for controlling a headlight of a vehicle, the method comprising:
- receiving images consecutively captured by a camera, with a device, the images showing an area in front of the vehicle;
- detecting, with the device, a road in one of the images;
- dividing, with the device, the road detected in the images into segments;
- tracking, with the device, the segments over time in the images;
- determining, with the device, at least one feature related to a brightness for each of the segments;
- determining, with the device, from the at least one feature related to the brightness of the segments whether preceding and/or oncoming traffic exists; and
- generating, with the device, a control signal for controlling the headlight of the vehicle if preceding and/or oncoming traffic exists; wherein;

the device is further configured to determine that preceding and/or oncoming traffic exists if one or more of;
the at least one feature related to the brightness of at least one of the segments surpasses a first threshold; and
a rise of the at least one feature related to the brightness of at least one of the segments surpasses a second threshold.

* * * * *